(12) United States Patent
Hayashi et al.

(10) Patent No.: US 6,579,933 B1
(45) Date of Patent: Jun. 17, 2003

(54) PROCESS FOR PRODUCING AQUEOUS SOLUTION OF MONOALLYLAMINE POLYMER

(75) Inventors: Ikuo Hayashi, Kooriyama (JP); Hiroyuki Takayama, Kooriyama (JP); Kenji Kageno, Kooriyama (JP)

(73) Assignee: Nitto Boseki Co., Ltd., Fukushima-ken (JP)

( * ) Notice: Subject to any disclaimer, the term of this patent is extended or adjusted under 35 U.S.C. 154(b) by 0 days.

(21) Appl. No.: 09/674,300

(22) PCT Filed: Mar. 3, 1999

(86) PCT No.: PCT/JP99/01013

§ 371 (c)(1),
(2), (4) Date: Nov. 16, 2000

(87) PCT Pub. No.: WO00/52070

PCT Pub. Date: Sep. 8, 2000

(51) Int. Cl.$^7$ .............................. C08F 26/02; C08F 4/04
(52) U.S. Cl. .................. 524/814; 526/75; 526/217; 526/236; 526/288; 526/287
(58) Field of Search .............................. 524/814; 526/75, 526/217, 236, 288, 287

(56) References Cited

U.S. PATENT DOCUMENTS

| | | | |
|---|---|---|---|
| 4,504,640 A | * 3/1985 | Harada et al. | ............... 526/193 |
| 4,528,347 A | 7/1985 | Harada et al. | |
| 4,559,391 A | * 12/1985 | Ueda et al. | ............... 525/328.2 |
| 4,626,577 A | * 12/1986 | Harada | ............... 525/328.2 |
| 4,749,759 A | 6/1988 | Shimizu et al. | |

FOREIGN PATENT DOCUMENTS

| | | |
|---|---|---|
| JP | 58-201811 | 11/1983 |
| JP | 0 142 962 | 5/1985 |
| JP | 60-104107 | 6/1985 |
| JP | 60-108405 | 6/1985 |
| JP | 6-2780 | 7/1987 |
| JP | 62-31722 | 7/1987 |
| JP | 6-2779 | 1/1994 |
| JP | 10-330427 | 12/1998 |

* cited by examiner

*Primary Examiner*—Kelechi Egwim
(74) *Attorney, Agent, or Firm*—Nixon & Vanderhye P.C.

(57) ABSTRACT

A high-molecular-weight monoallylamine polymer aqueous solution containing a monoallylamine polymer having a weight average molecular weight of 20,000 to 180,000 is prepared by polymerizing a monoallylamine sulfate in an aqueous medium in the presence of a specific radical polymerization initiator, and thereby providing the above high-molecular-weight monoallylamine polymer in an aqueous solution. High-molecular-weight monoallylamine polymer for various uses can be efficiently prepared.

11 Claims, 3 Drawing Sheets

PROCESS FOR PRODUCING AQUEOUS SOLUTION OF MONOALLYLAMINE POLYMER

TECHNICAL FIELD

The present invention relates to a process for the preparation of a monoallylamine polymer aqueous solution as well as a high-molecular-weight monoallylamine polymer aqueous solution. More specifically, the present invention relates to a process for preparing a high-molecular-weight monoallylamine polymer aqueous solution efficiently and industrially advantageously, and a high-molecular-weight monoallylamine polymer aqueous solution which is not only useful in various fields including polymer flocculants and coating agents but also useful as a raw material for water-absorbing resins and ion-exchange resins and a raw material for functional polymer materials.

TECHNICAL BACKGROUND

A monoallylamine polymer is a linear olefin polymer having a primary amino group in a side chain, and it is a cationic polymer compound which is well soluble in water and positively charged in water. Such a monoallylamine polymer has a characteristic reactive polymer structure and characteristic properties, so that it is used in many fields including polymer flocculants, coating agents, dye fixing agents for reactive dyes and direct dyes and additives for inkjet recording papers.

While it is generally known that a monoallylamine does not easily undergo polymerization due to its degradative chain transfer, various methods have been proposed for preparing a monoallylamine addition salt polymer or a free monoallylamine polymer by polymerizing a monoallylamine addition salt in the presence of a specific radical polymerization initiator.

However, these methods involve various problems when a high-molecular-weight and free monoallylamine polymer is prepared, and these methods have not been fully satisfactory.

For example, JP-A-58-201811 describes that a monoallylamine phosphate aqueous solution is polymerized in the presence of a radical polymerization initiator having a molecule containing an azo group and a cationic nitrogen, whereby a monoallylamine phosphate polymer having a number average molecular weight of 36,000 to 45,000 can be obtained. It is thinkable to produce a high-molecular-weight and free monoallylamine polymer by preparing a high-molecular-weight monoallylamine phosphate polymer according to the above method and then neutralizing the monoallylamine phosphate polymer with an alkali.

However, this method involves a problem in the removal of phosphate formed as a byproduct. An inorganic phosphate cannot be removed by electrodialysis using an ion-exchange membrane. It is therefore thinkable to remove the inorganic phosphate by neutralizing a polymerization-completed solution and filtering off the precipitated phosphate. When this method is actually attempted, however, there are problems that the removal of the inorganic phosphate is insufficient, and that a free monoallylamine polymer adheres to the inorganic phosphate that is filtered off, so that the yield of the polymer as an end product is decreased. Further, phosphate that is inevitably contained in the polymer is not necessarily desirable in view of environments.

JP-A-10-330427 discloses a method of producing a high-molecular-weight monoallylamine hydrochloride polymer by polymerizing a monoallylamine hydrochloride aqueous solution in the presence of the above radical polymerization initiator and a specific crosslinking agent. However, this method has a problem that the monoallylamine hydrochloride polymer inevitably contains units derived from the crosslinking agent.

Further, JP-B-6-2779 discloses a method in which a monoallylamine inorganic acid salt aqueous solution is polymerized in the presence of a specific radical polymerization initiator having a molecule containing an azo group and an allylamidino group, to produce a high-molecular-weight monoallylamine inorganic acid salt polymer. In this method, however, the high-molecular-weight polymer is obtained by using a large amount of a catalyst, so that it is considered that the allylamidino group is taken into the polymer. Presumably for this reason, there is a problem that the molecular weight of the polymer decreases in the aqueous solution with the passage of time. This phenomenon is presumably caused by the decomposition of the amidino group in the polymer.

Concerning the polymerization of a monoallylamine sulfate, for example, JP-B-62-31722 discloses a method in which an aqueous solution of monoallylamine sulfate is polymerized in the presence of a radical polymerization initiator having a molecule containing an azo group and cationic nitrogen, then a polymerization-completed solution and water are mixed to form a precipitate in the form of a starch syrup, the precipitate is purified to obtain a solid of a monoallylamine sulfate polymer and the solid of a monoallylamine sulfate polymer is treated with ammonia-methanol to obtain a methanolic solution of a monoallylamine polymer.

In this method, however, handling of the precipitate in the form of a starch syrup is complicated when the monoallylamine sulfate polymer is purified, and it is difficult to industrially produce a free monoallylamine polymer.

Further, JP-A-58-201811 discloses a method in which an aqueous solution of a monoallylamine sulfate is polymerized in the presence of a radical polymerization initiator having a molecule containing an azo group and cationic nitrogen, a polymerization-completed solution and water are mixed to form a precipitate in the form a starch syrup, the precipiate is fully washed and then dissolved in concentrated hydrochloric acid, and the resultant solution is added to methanol to re-precipitate a solid, whereby a monoallylamine hydrochloride polymer having a number average molecular weight of 6,500 is produced.

However, this method has a problem that it is difficult to wash the above precipitate since the handling of the precipitated monoallylamine sulfate polymer in the form of a starch syrup is troublesome. According to studies made by the present inventors, a polymer finally obtained is not completed as a product of a hydrochloride, which presumably results in the polymer therefore having a low number average molecular weight of 6,500.

DISCLOSURE OF THE INVENTION

Under the circumstances, it is therefore a first object of the present invention to provide an industrially advantageous process capable of efficiently producing a high-molecular-weight and free monoallylamine polymer aqueous solution from a monoallylamine as a raw material with easy purification without using a phosphate thereof.

It is a second object of the present invention to provide a high-molecular-weight monoallylamine polymer aqueous solution which is useful in various fields of polymer flocculants and coating agents, which does not contain any unit derived from a crosslinking agent or phosphorus and which is stable with the passage of time.

For achieving the above objects, the present inventors have made diligent studies and as a result have found the following. A monoallylamine sulfate is polymerized in an aqueous medium in the presence of a specific radical polymerization initiator and the polymerization solution is neutralized with an alkali, whereby, unexpectedly, a high-molecular-weight and free monoallylamine polymer aqueous solution can be easily obtained, and the above object can be achieved. On the basis of this finding, the present invention has been accordingly completed.

That is, the first object of the present invention is achieved by a process for the preparation of a monoallylamine polymer aqueous solution, which comprises polymerizing a monoallylamine sulfate in an aqueous medium in the presence of a radical polymerization initiator having a molecule containing an azo group and cationic nitrogen and neutralizing the resultant polymerization solution with an alkali, to obtain an aqueous solution containing a high-molecular-weight monoallylamine polymer having a weight average molecular weight, measured by a sedimentation equilibrium method, of 20,000 to 180,000.

Further, the second object of the present invention is achieved by a high-molecular-weight monoallylamine polymer aqueous solution containing neither a unit derived from a crosslinking agent nor phosphorus and containing a monoallylamine polymer having a weight average molecular weight, measured by a sedimentation equilibrium method, of 20,000 to 180,000.

BRIEF DESCRIPTION OF DRAWINGS

In FIG. 1, numeral 1 shows a starting liquid vessel, 2 shows a concentrated liquid vessel, 3 shows a dilution chamber, 4 shows a concentration chamber, 5 shows an electrode chamber, 6 shows an electrode plate, 7 shows a starting liquid line, 8 shows a concentrated liquid line, 9 shows an electric vessel, $P_1$ and $P_2$ show pumps, respectively, A is an anion exchange membrane, and C shows a cation exchange membrane.

BEST MODE FOR PRACTICING THE INVENTION

In the process for the preparation of a monoallylamine polymer aqueous solution, provided by the present invention, a monoallylamine sulfate is used as a raw material. The monoallylamine sulfate can be prepared by adding a monoallylamine and sulfuric acid to an aqueous medium and mixing the monoallylamine with the sulfuric acid.

In this case, preferably, the amount of the sulfuric acid is larger than the stoichiometric amount thereof for converting the monoallylamine into a salt. Particularly advantageously, the sulfuric acid is used in an amount of 0.75 to 1.4 mol per mole of the monoallylamine. When the amount of the sulfuric acid is outside the above range, undesirably, the molecular weight of the polymer obtained is liable to be low.

As described in JP-B-6-2780, it is known in the polymerization of a monoallylamine hydrochloride that, when the amount of hydrochloric acid is larger than the stoichiometric amount thereof for converting a monoallylamine into a salt, the molecular weight of a polymer obtained is low. It has been therefore unexpected that a high-molecular-weight monoallylamine polymer can be obtained when the amount of sulfuric acid is in the above range.

In the process of the present invention, the above polymerization of a monoallylamine sulfate is carried out in an aqueous medium in the presence of a radical polymerization initiator. Examples of the aqueous medium include water, an inorganic acid aqueous solution, an organic acid aqueous solution, and aqueous solutions of inorganic acid salts (such as zinc chloride, calcium chloride and magnesium chloride).

As a radical polymerization initiator, it is required to use a compound having a molecule containing an azo group and cationic nitrogen. The radical polymerization initiator can be selected from known compounds as required. Of such compounds, an inorganic acid salt or an organic acid salt of an azo compound represented by the general formula (I) is practically used in view of easiness in synthesis.

$$R^1-N=N-R^2 \quad (I)$$

wherein at least one of $R^1$ and $R^2$ is a group containing a cationizable nitrogen atom, selected from an aminohydrocarbyl group, an amidinylhydrocarbyl group or a cyanoaminohydrocarbyl group, the remaining one if any is a hydrocarbyl group or a cyanohydrocarbyl group, and $R^1$ and $R^2$ together may form a single alkylene group of the general formula (II), $$\overset{(a)}{\underset{}{\phantom{-}}}\overset{R}{\underset{X}{|}}\overset{(b)}{\underset{}{\phantom{-}}} \quad (II)$$

in which R is an alkylene group, X is a group containing a cationizable nitrogen atom, and covalent bonds (a) and (b) bond to the nitrogen atoms of the azo group and form an azo group-containing ring.

Of $R^1$ and $R^2$ in the general formula (I), the aminohydrocarbyl group includes, for example, aminoalkyl, aminoaryl, aminoalkaryl and aminoaralkyl, the amidinylhydrocarbyl group includes, for example, amidinylalkyl, amidinylaryl, amidinylalkaryl and amidinylaralkyl, and the cyanoaminohydrocarbyl group includes, for example, cyanoaminoalkyl, cyanoaminoaryl, cyanoaminoalkaryl and cyanoaminoaralkyl. Further, the hydrocarbyl group includes, for example, alkyl, aryl, alkaryl and aralkyl, and the cyanohydrocarbyl group includes, for example, cyanoalkyl, cyanoaryl, cyanoalkaryl and cyanoaralkyl.

The alkylene group which R in the general formula (II) represents includes, for example, linear alkylene, alkylalkylene and arylalkylene.

Examples of the radical polymerization initiator of the above general formula (I) include 2,2'-diamidinyl-2,2'-azopropane.dihydrochloride, 2,2'-diamidinyl-2,2'-azobutane.dihydrochloride, 2,2'-diamidinyl-2,2'-azopentane.dihydrochloride, 2,2'-bis(N-phenylamidinyl)-2,2'-azopropane.dihydrochloride, 2,2'-bis(N-phenylamidinyl)-2,2'-azobutane.dihydrochloride, 2,2'-bis(N,N-dimethylamidinyl)-2,2'-azopropane.dihydrochloride, 2,2'-bis(N,N-dimethylamidinyl)-2,2'-azobutane.dihydrochloride,2,2'-bis (N,N-diethylamidinyl)-2,2'-azopropane.dihydrochloride, 2,2'-bis(N,N- diethylamidinyl)-2,2'-azobutane.dihydrochloride, 2,2'-bis (N-di-n-butylamidinyl)-2,2'-azopropane.dihydrochloride, 2,2'-bis(N-di-n-butylamidinyl)-2,2'-azobutane.dihydrochloride, 3,3'-bis(N,N-di-n-butylamidinyl)-3,3'-azopentane.dihydrochloride, azo-bis-N,N'-dimethyleneisobutylamidine.dihydrochloride, 2,2'-azo-bis(2-methyl-4-diethylamino)-butyronitrile.dihydrochloride, 2,2'-azo-bis(2-methyl-4-dimethylamino)-butyronitrile.dihydrochloride, 2,2'-azo-bis(2-methyl-4-diethylamino)-butyronitrile.dihydrochloride, quaternary ammonium salt type azonitrile obtained by converting 2,2'-azo-bis(2-methyl-4-diethylamino)-butyronitrile or 2,2'-azo-bis(2-methyl-4-dimethylamino)-butyronitrile into a quaternary type with dimethylsulfuric acid or methyl p-toluenesulfonate, 3,5-diamidinyl-1,2-diazo-1-cyclopentane.dihydrochloride, 3-methyl-3,4-diamidinyl-1,2-diazo-1-cyclopentene.dihydrochloride, 3-ethyl-3,5-diamidinyl-1,2-diazo-1-cyclopentene.dihydrochloride, 3,5-dimethyl-3,5-diamidinyl-1,2-diazo-1-cyclopentene.dihydrochloride, 3,6-diamidinyl-1,2-diazo-1-cyclohexene.dihydrochloride, 3-phenyl-3,5-diamidinyl-1,2-diazo-1-cyclopentene.dihydrochloride and 3,5-diphenyl-3,5-diamidinyl-1,2-diazo-1-cyclopentene-dihydrochloride.

Further, the radical polymerization initiator can be also preferably selected from 2,2'-azobis[2-(3,4,5,6-tetrahydropyrimidine-2-yl)propane].dihydrochloride, 2,2'-azobis[2-(5-methyl-2-imidazoline-2-yl)propane].dihydrochloride, 2,2'-azobis[2-(imidazoline-2-yl)propane].dihydrochloride, 2,2'-azobis-(2-methyl-propioamidoxime).dihydrochloride, 2,2'-azobis-(2-methyl-butyloamidoxime).dihydrochloride or 2,2'-azobis-(2-ethyl-butyloamidoxime).dihydrochloride.

In the present invention, these radical polymerization initiators may be used alone or in combination of at least two of these. The amount of the radical polymerization initiator based on the monoallylamine sulfate is preferably in the range of from 0.1 to 0.7 mol %. When the amount of the radical polymerization initiator is less than 0.1 mol %, the polymerization does not easily take place. When it exceeds 0.7 mol %, a polymer is liable to undergo gelation when the polymerization-completed solution is neutralized with an alkali.

When the polymerization is carried out, the concentration of the monoallylamine sulfate in the reaction system is preferably higher so long as the monoallylamine sulfate is dissolvable, and the concentration thereof is generally determined in the range of from 60 to 90% by weight. When the concentration is less than 60% by weight, a polymer obtained tends to have a low molecular weight.

Further, the polymerization temperature is preferably in the range of from 20 to 70° C. When the polymerization temperature is lower than 20° C., the polymerization rate is liable to decrease. When it exceeds 70° C., a polymer obtained may have no high molecular weight, and it may be difficult to obtain a high-molecular-weight polymer.

The polymerization time period cannot be uniformly determined since it differs depending upon the polymerization temperature, a kind and an amount of the radical polymerization initiator. However, it is sufficient to carry out the polymerization generally for approximately 6 to 120 hours.

In the process of the present invention, the polymerization is carried out as described above, and then the polymerization-completed solution is neutralized with an alkali. In this case, when the concentration of the polymer is too high, the polymer is liable to undergo solidification during the neutralization, which makes handling difficult. It is therefore advantageous to adjust the concentration of the monoallylamine sulfate polymer in the polymerization solution to less than 60% by weight with an aqueous solvent, before the neutralization with an alkali is carried out. Further, when the above concentration is too low, the monoallylamine sulfate polymer is not easily dissolved, so that the above concentration is preferably in the range of from 40% by weight to less than 60% by weight in view of easiness in operation.

The alkali for the neutralization is selected from an aqueous solution containing a hydroxide, carbonate or hydrogencarbonate of an alkali metal such as sodium, potassium or lithium, or aqueous ammonia.

In addition, when a free monoallylamine polymer is produced after a monoallylamine phosphate is polymerized, it is required to dilute a polymer with water to a considerable degree without taking account of formation into a starch syrup, in order to prevent the precipiation of an insoluble phosphate during the neutralization, so that the workability is poor.

In the present invention, preferably, the polymerization solution is neutralized, and then unreacted monoallylamine is distilled off. The unreacted monoallylamine is preferably distilled off under reduced pressure, and this process is more preferably carried out under conditions of a temperature of 40 to 100° C. and a vacuum degree of 10 to 300 mmHg, particularly preferably a temperature of 50 to 80° C. and a vacuum degree of 20 to 200 mmHg.

In the above treatment, generally, the monoallylamine polymer is separated as an organic phase, and the polymer is taken out and diluted to a proper concentration with an aqueous medium, whereby an aqueous solution of a free monoallylamine polymer having a desired molecular weight can be obtained.

The above aqueous medium is selected from water or water containing an organic solvent miscible with water.

While the thus-obtained monoallylamine polymer aqueous solution can be used as it is for some uses, it can be subjected to purification treatment such as removal of an inorganic salt as required.

The above purification treatment is not critical and can be selected from known methods. Electrodialysis is preferred. The electrodialysis is preferably carried out with an ion-exchange membrane.

A mode of practice of the electrodialysis with an ion-exchange membrane will be explained with reference to an attached drawing below.

Figure 1:
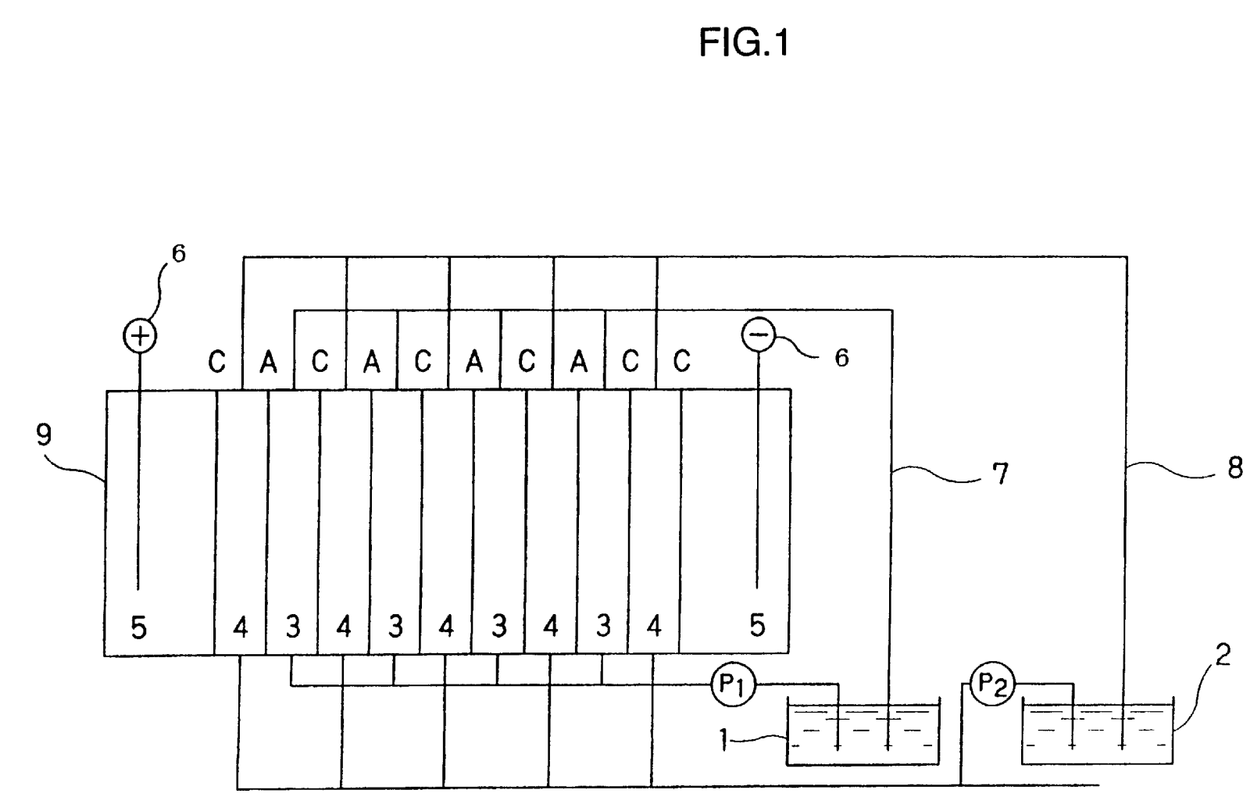
FIG. 1 is a schematic view of one example of an electrodialyzer for use in the process for the preparation of a monoallylamine polymer aqueous solution, provided by the present invention.

FIG. 1 is a schematic view of one example of an electrodializer for use in the present invention. An electric vessel 9 has cation exchange membranes C and anion exchange membranes A which are arranged alternately in parallel with one another, and it is constituted of dilution chambers 3, concentration chambers 4 and electrode chambers 5 which are partitioned with the membranes. The electrode chambers 5 on both ends of the electric vessel 9 are provided with an anode or cathode electrode plate 6. A starting liquid (monoallylamine polymer aqueous solution) charged into a starting liquid vessel 1 is sent to the dilution chambers 3 of the electric vessel 9 with a pump $P_1$. Then, coloring components, etc., move to the concentration chambers 4 through the cation exchange membranes C or the anion exchange membranes A. During the movement, the monoallylamine polymer is blocked with each cation exchange membrane C and therefore remains in the dilution chambers 3, and as it is, it remains in a state where it is improved in coloring. On the other hand, an electrolytic solution which is a concentrated liquid is charged into the concentrated liquid vessel 2 and the electrode chambers 5. The concentrated liquid is sent to the concentration chamber 4 with a pump $P_2$.

Specifically, the starting liquid, the concentrated liquid and an electrode liquid are circulated to the dilution chambers 3, the concentration chambers 4 and the electrode chambers 5, respectively, and DC voltage is applied between the electrode plates 6, whereby the coloring components, etc., are gradually removed from the starting liquid charged in the starting liquid vessel 1 by dialysis, and the coloring components, etc., dialyzed in the concentrated liquid is concentrated in the concentrated liquid vessel 2. As a result, a polymer solution improved in coloring degree comes to be stored in the starting liquid vessel 1, and the coloring components, etc., come to be concentrated and stored in the concentrated liquid vessel 2. In this case, impurities derived from a neutralization salt or the initiator are concentrated and stored in the concentrated liquid vessel 2 together. In this manner, there can be obtained a monoallylamine polymer aqueous solution which is improved in coloring and from which impurities derived from the neutralization salt or the initiator are removed. In addition, 7 shows a starting liquid line, and 8 shows a concentrated liquid line.

The cation exchange membrane and the anion exchange membrane used in the present invention can be general ion exchange membranes (e.g., CMV, AMV, etc., supplied by Asahi Glass Co., Ltd.), and it is not necessary to use any special ion exchange membranes. Further, the electrodialysis vessel in which these ion exchange membranes are fitted can be also selected from commercially available ones, and it is not necessary to particularly determine the membrane/membrane distance, the number of the chambers or a manner of passing the aqueous solution through chambers.

The monoallylamine polymer aqueous solution obtained by the above electrodialysis generally comes to have an ignition residue content of 5% by weight or less based on the monoallylamine polymer. The "ignition residue content" refers to a value obtained by combusting a monoallylamine aqueous polymer solution at 650° C. for 2.5 hours and then measuring an amount of the residue.

According to the above process of the present invention, there can be obtained an aqueous solution containing a high-molecular-weight monoallylamine polymer having recurring units of the formula (III) and having (III)

a weight average molecular weight, measured by a sedimentation equilibrium method, of 20,000 to 180,000, preferably 30,000 to 150,000, more preferably 40,000 to 100,000. The measurement of a weight average molecular weight according to the sedimentation equilibrium method will be explained in detail later.

According to the present invention, there is also provided the above high-molecular-weight monoallylamine polymer aqueous solution. This aqueous solution preferably has an ignition residue content of 5% by weight or less based on the monoallylamine polymer.

The above high-molecular-weight monoallylamine polymer aqueous solution can be useful in various fields, for example, of polymer flocculants, coating agents, coating compositions for ink-receiving layers of inkjet recording films, vehicles of water-based coating compositions, and the like.

The present invention will be explained more in detail with reference to Examples, while the present invention shall not be limited by these Examples.

Obtained monoallylamine polymers were GPC-measured with a HITACHI L-6000 type high-performance liquid chromatograph. A HITACHI L-6000 was used as an eluent line pump, a Shodex RI SE-61 (trade name) differential refractive index detector was used as a detector, and a column prepared by connecting Asahi Pack water-based gel filter types GS-220HQ (exclusion limit molecular weight 3,000) and GS-620HQ (exclusion limit molecular weight 2,000,000) in series was used. A sample was adjusted to a concentration of 0.5 g/100 ml with an eluent, and 20 μl thereof was used. As an eluent, a 0.4 mol/liter sodium chloride aqueous solution was used. The measurement was carried out at a column temperature of 30° C. at a flow rate of 1.0 ml/minute.

Monoallylamine polymers were measured for weight average molecular weights $\overline{M}w$ by a sedimentation equilibrium method.

That is, a monoallylamine hydrochloride polymer as a solid was obtained from a free-polymer aqueous solution according to a method to be described later, and the monoallylamine hydrochloride polymer was measured for an intrinsic viscosity [η] in a 3.5 M sodium chloride aqueous solution under a condition of 30° C. And, a weight average molecular weight was determined on the basis of the following equation.

$$[\eta]=1.41\times10^{-3}\times\overline{M}w^{0.5}$$

EXAMPLE 1

A four-necked separable flask with a stirrer, a thermometer and a Dimroth reflux cooling tube was charged with 252.8 g (2.5 mol) of a 97 wt % sulfuric acid aqueous solution and 46.2 g of water, and 142.8 g (2.5 mol) of a monoallylamine was dropwise added with stirring at 20 to 30° C. After the dropwise addition, the mixture was heated up to 45° C., to obtain a homogeneous monoallylamine sulfate solution.

To the solution was added a 15 wt % aqueous solution of 2.03 g of 2,2'-diamidinyl-2,2'-azopropane-dihydrochloride in an amount of 0.3 mol % based on the monomer, and the monoallylamine sulfate aqueous solution was polymerized for 48 hours in a state where the monoallylamine sulfate had a concentration of 87 wt % while the polymerization temperature was maintained at 48±2° C.

After completion of the polymerization, 317.0 g of water was added to the polymerization solution. In this case, the mixture did not come to be in a starch syrup, and a uniform viscous solution was obtained.

The above solution was cooled to 10° C., and 408.2 g (5 mol) of a 49 wt % sodium hydroxide aqueous solution was dropwise added at 20 to 30° C. to neutralize the solution. Then, non-polymerized monoallylamine was distilled off under reduced pressure at 50° C. As a result, the system was separated into three phases made of a monoallylamine polymer organic phase, a sodium sulfate aqueous phase and a sodium sulfate solid phase.

The aqueous phase and the sodium sulfate solid phase was removed from the system, and 700.0 g of distilled water was added to the remaining monoallylamine polymer organic phase to adjust the monoallylamine polymer concentration to 9.5 wt %. The monoallylamine polymer concentration was determined by a potentiometric titration method.

The thus-adjusted solution was subjected to an ion-exchange membrane electrodialyzer (DS-zero types supplied by Asahi Glass Co., Ltd., 11 cation-exchange membranes CMV and 11 anion-exchange membranes AMV) to remove impurities and purify the solution. The resultant aqueous solution was concentrated under reduced pressure at 50° C., to adjust the monoallylamine polymer concentration of 20 wt %, whereby a high-purity (free) monoallylamine polymer aqueous solution was obtained.

Figure 2:
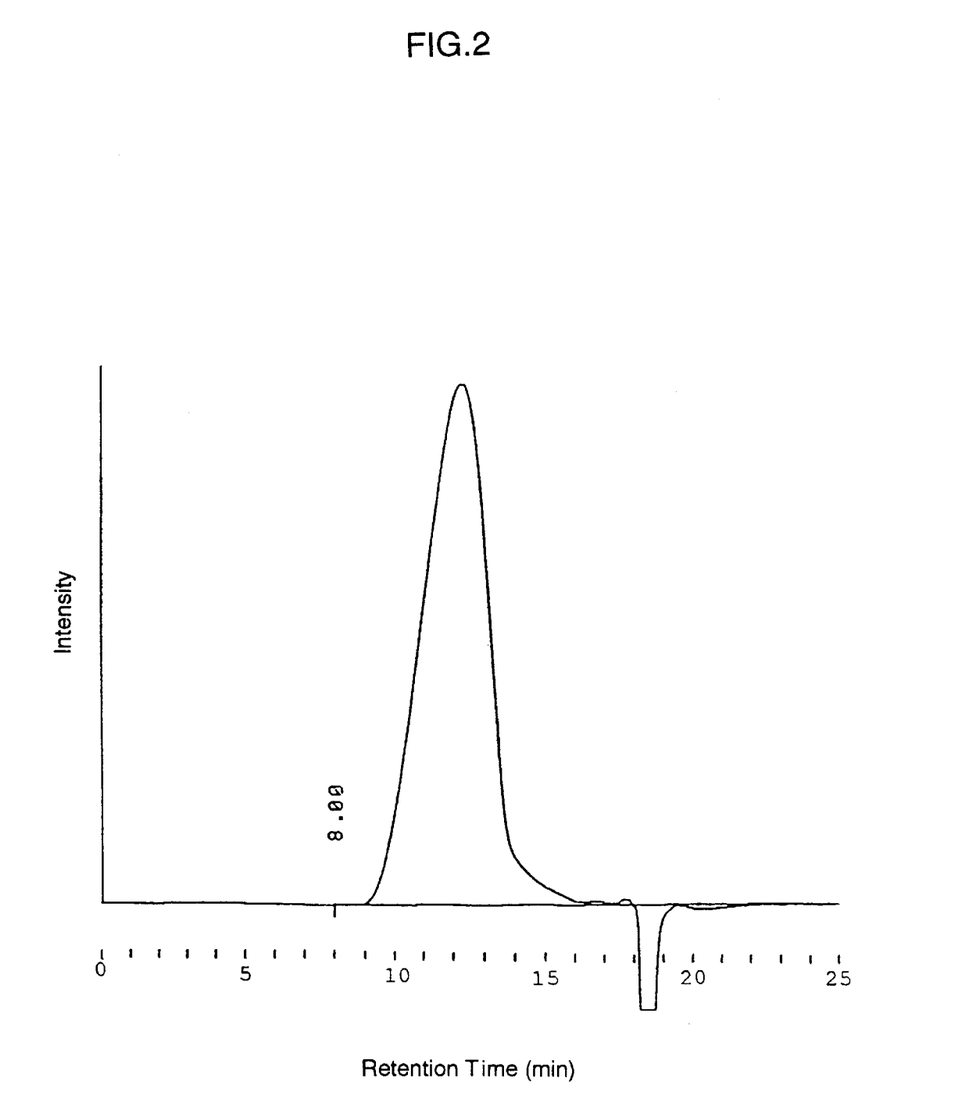
FIGS. 2 and 3 are a diagram of a result of measurement of a monoallylamine polymer obtained in Example 1 by a GPC method and an IR spectrum of the monoallylamine hydrochloride polymer, respectively.

The above solution was GPC-measured, and FIG. 2 shows the result. The peak of the GPC was close to a normal distribution, and it was therefore supported that the obtained monoallylamine polymer was a non-crosslinked polymer. Further, the GPC result shows that the yield of the polymer as an aqueous solution was 645 g (Yield 91%). Further, the monomer content based on the polymer was 100 ppm or less. The ignition residue content (650° C., 2.5 hours) based on the polymer was 0.1% or less.

Figure 3:
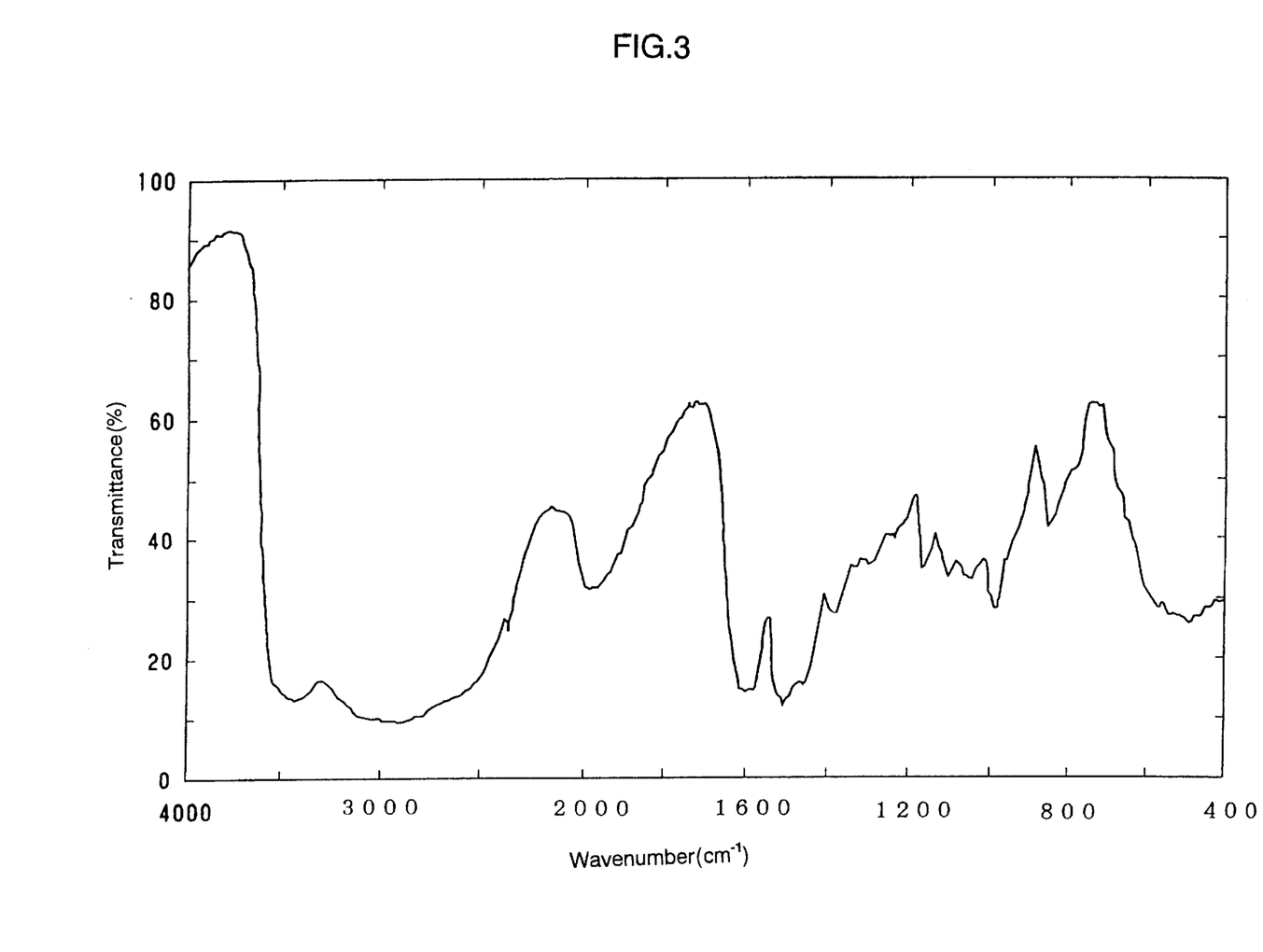

Then, part of the 20 wt % high-purity (free) monoallylamine polymer aqueous solution was taken out, and concentrated hydrochloric acid was added in an amount equimolar to, or larger than, the molar amount of amino group in the polymer, to obtain an aqueous solution of a monoallylamine hydrochloride. A large amount of methanol was added thereto, and the resultant precipitate was recovered by filtration and dried under reduced pressure to give a solid monoallylamine hydrochloride polymer. FIG. 3 shows an IR spectrum of the thus-obtained polymer.

The above spectrum was similar to that of a solid prepared by solidifying an aqueous solution of a monoallylamine hydrochloride polymer (PAA-HCl-3L, supplied by Nitto Boseki Co., Ltd.). The result supports that the solution before the addition of the hydrochloric acid was a (free) monoallylamine polymer aqueous solution.

Further, the polymer as the monoallylamine hydrochloride polymer was measured for a molecular weight by the sedimentation equilibrium method, to show 65,000.

EXAMPLES 2–9

Comparative Examples 1–5

Monoallylamine polymers were prepared under various conditions, and Table 1 shows the results.

A four-necked separable flask with a stirrer, a thermometer and a Dimroth cooling tube was charged with a predetermined amount of an acid aqueous solution, and 142.8 g (2.5 mol) of a monoallylamine was dropwise added with stirring at 20 to 30° C. After the dropwise addition, the mixture was heated, to give a homogeneous solution.

To the solution was added a predetermined amount of an aqueous solution of a catalyst, and the monoallylamine was polymerized at a temperature shown in Table 1.

The resultant solution was checked by GPC, and if it was found that the solution contained a sufficient monoallylamine inorganic acid salt polymer, the solution was cooled to 10° C. and an aqueous solution containing sodium hydroxide in an amount equimolar to the molar amount of the acid used was dropwise added at 20 to 30° C. to neutralize the solution. Then, the neutralized solution was subjected to ion-exchange membrane electrodialysis as described in Example 1, to give a high-purity (free) monoallylamine polymer aqueous solution. Table 1 shows the results.

TABLE 1

| | Catalyst (mol % of catalyst based on monomer) | Monomer concentration (wt %) | Acid (molar ratio of acid to monomer) | neutralization equivalent weight ratio | Polymerization temperature (° C.) | Polymerization time (hour) | Weight average molecular weight $\overline{M}w$ | Yield (%) |
|---|---|---|---|---|---|---|---|---|
| Ex. 1 | V-50 (0.3) | 87 | Sulfuric acid (1.0) | 2.0 | 48 | 48 | 65,000 | 91 |
| Ex. 2 | V-50 (0.3) | 87 | Sulfuric acid (0.8) | 1.6 | 48 | 48 | 42,000 | 84 |
| Ex. 3 | V-50 (0.3) | 74 | Sulfuric acid (1.35) | 2.7 | 48 | 48 | 43,000 | 83 |
| Ex. 4 | V-50 (0.3) | 77 | Sulfuric acid (1.0) | 2.0 | 48 | 48 | 51,000 | 80 |
| Ex. 5 | V-50 (0.45) | 87 | Sulfuric acid (1.0) | 2.0 | 40 | 48 | 67,000 | 88 |
| Ex. 6 | V-50 (0.16) | 87 | Sulfuric acid (1.0) | 2.0 | 60 | 48 | 53,000 | 86 |
| Ex. 7 | V-50 (0.6) | 87 | Sulfuric acid (1.0) | 2.0 | 40 | 48 | 64,000 | 90 |
| Ex. 8 | VA-044 (0.45) | 87 | Sulfuric acid (1.0) | 2.0 | 48 | 72 | 39,000 | 82 |
| Ex. 9 | OTazo30 (0.45) | 87 | Sulfuric acid (1.0) | 2.0 | 40 | 96 | 37,000 | 75 |

TABLE 1-continued

| | Catalyst (mol % of catalyst based on monomer) | Monomer concentration (wt %) | Acid (molar ratio of acid to monomer) | neutralization equivalent weight ratio | Polymerization temperature (° C.) | Polymerization time (hour) | Weight average molecular weight $\overline{M}w$ | Yield (%) |
|---|---|---|---|---|---|---|---|---|
| CEx. 1 | V-50 (0.45) | 87 | hydrochloric acid (1.0) | 1.0 | 48 | 48 | 12,000 | 20 |
| CEx. 2 | V-50 (0.45) | 45 | hydrochloric acid (2.0) | 2.0 | 48 | 48 | — | trace amount |
| CEx. 3 | V-50 (0.45) | 87 | phophoric acid (0.67) | 2.0 | 48 | 48 | — | trace amount |
| CEx. 4 | APS (0.45) | 87 | surfuric acid (1.0) | 2.0 | 48 | 48 | — | trace amount |
| CEx. 5 | Hydrogen peroxide (0.45) | 87 | sulfuric acid (1.0) | 2.0 | 48 | 48 | — | trace amount |

Notes:
Ex. = Example
CEx. = Comparative Example
V-50: 2,2'-diamidinyl-2,2'-azopropanedihydrochloride
VA-044: 2,2'-azobis[2-(2-imidazoline-2-yl)propane].dihydrochloride
OTAzo30: 2,2'-azobis(2-methylbutaneamidoxime).dihydrochloride
APS: ammonium persulfate As is clear in Table 1, it has been found that high-molecular-weight and free monoallylamine polymers can be produced simply at high yields according to the production process of the present invention.

INDUSTRIAL UTILITY

According to the present invention, high-molecular-weight monoallylamine polymer aqueous solution useful in fields of polymer flocculants, coating agents, etc., can be remarkably efficiently and industrially advantageously prepared from a monoallylamine sulfate as a raw material.

What is claimed is:

1. A process for the preparation of a monoallylamine polymer aqueous solution, which comprises
   (a) providing a monoallylamine sulfate having a concentration of 60 to 90% by weight in an aqueous medium,
   (b) polymerizing the monoallylamine sulfate in the aqueous medium in the presence of a radical polymerization initiator having a molecule containing an azo group and cationic nitrogen, to produce a polyallylamine sulfate polymer,
   (c) adjusting the concentration of the polyallylamine sulfate polymer in a polymerization solution to less than 60% by weight with an aqueous solvent, and
   (d) neutralizing the resultant polymerization solution with an alkali aqueous solution, to obtain an aqueous solution containing a high-molecular-weight monoallylamine polymer having a weight average molecular weight, measured by a sedimentation equilibrium method, of 20,000 to 180,000.

2. The process of claim 1, wherein an aqueous solution containing a high-molecular-weight monoallylamine polymer having a weight average molecular weight, measured by a sedimentation equilibrium method, of 30,000 to 150,000 is prepared.

3. The process of claim 2, wherein an aqueous solution containing a high-molecular-weight monoallylamine polymer having a weight average molecular weight, measured by a sedimentation equilibrium method, of 40,000 to 100,000 is prepared.

4. The process of claim 1, wherein the monoallylamine sulfate is prepared by mixing the monoallylamine with sulfuric acid whose amount is 0.75 to 1.4 mol per mole of the monoallylamine.

5. The process of claim 1, wherein the radical polymerization initiator having a molecule containing an azo group and cationic nitrogen is an inorganic acid salt or an organic acid salt of an azo compound of the general formula (I), $$R^1\text{—}N\text{=}N\text{—}R^2 \qquad (I)$$

wherein at least one of $R^1$ and $R^2$ is a group containing a cationizable nitrogen atom, selected from an aminohydrocarbyl group, an amidinylhydrocarbyl group or a cyanoaminohydrocarbyl group, the remaining one if any is a hydrocarbyl group or a cyanohydrocarbyl group, and $R^1$ and $R^2$ together may form a single alkylene group of the general formula (II), $$\underline{(a)}\ \overset{R}{\underset{X}{|}}\ \underline{(b)} \qquad (II)$$

in which R is an alkylene group, X is a group containing a cationizable nitrogen atom, and covalent bonds (a) and (b) bond to the nitrogen atoms of the azo group and form an azo-group-containing ring.

6. The process of claim 1, wherein an amount of the radical polymerization initiator is 0.1 to 0.7 mol % based on the monoallylamine sulfate.

7. The process of claim 1, wherein the polymerization is carried out at a temperature of 20 to 70° C.

8. The process of claim 1, wherein, after the neutralization with an alkali, the monoallylamine polymer is collected as an organic phase, diluted with an aqueous solvent and then electrodialyzed.

9. The process of claim 1, wherein the concentration of the polyallylamine sulfate polymer in the polymerization solution is adjusted to at least 40% by weight but less than 60% by weight with an aqueous solvent.

10. The process of claim 1, wherein, after the neutralization of the polymerization solution with an alkali aqueous solution, unreacted monoallylamine is distilled off.

11. The process of claim 10, wherein the unreacted monoallylamine is distilled off, and then the monoallylamine polymer is recovered as an organic phase and diluted with an aqueous solvent, followed by electrodialysis.

* * * * *